United States Patent
Winer et al.

(10) Patent No.: US 10,769,701 B1
(45) Date of Patent: Sep. 8, 2020

(54) SENSORY-BASED DELIVERY OF CONTENT

(71) Applicant: Amazon Technologies, Inc., Reno, NV (US)

(72) Inventors: Corby Winer, New York, NY (US); Amanda Crivlare, Chicago, IL (US); Michael Naro Norman, River Edge, NJ (US); Matthew Douglas Morton, New York, NY (US); Whitney Weisman, New York, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 224 days.

(21) Appl. No.: 15/907,031

(22) Filed: Feb. 27, 2018

(51) Int. Cl.
*G06F 3/01* (2006.01)
*G06Q 30/06* (2012.01)
*G06Q 30/02* (2012.01)

(52) U.S. Cl.
CPC ......... *G06Q 30/0631* (2013.01); *G06F 3/016* (2013.01); *G06F 3/017* (2013.01); *G06Q 30/0257* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 7,301,527 | B2* | 11/2007 | Marvit | G06F 1/1626 345/156 |
| 8,799,806 | B2* | 8/2014 | Stallings | G06F 3/04812 715/777 |
| 9,275,077 | B2* | 3/2016 | Lee | G06F 16/58 |
| 9,398,144 | B2* | 7/2016 | Philbin | H04M 1/72594 |
| 9,519,684 | B2* | 12/2016 | Xu | G06Q 50/01 |
| 9,576,400 | B2* | 2/2017 | van Os | G06T 11/001 |
| 9,604,143 | B1* | 3/2017 | Narala | G06F 16/638 |
| 9,639,174 | B2* | 5/2017 | Schulz | G06F 3/03 |
| 9,753,539 | B2* | 9/2017 | Hwang | G06F 3/016 |

(Continued)

FOREIGN PATENT DOCUMENTS

CN 105892878 A * 8/2016

OTHER PUBLICATIONS

Westeyn, T., et al., "Georgia Tech Gesture Toolkit: Supporting Experience in Gesture Recognition," ICMI '03 Vancouver, British Columbia, Canada, 8 pages, Nov. 5, 2003. (Year: 2003).*

(Continued)

*Primary Examiner* — Nicholas D Rosen
(74) *Attorney, Agent, or Firm* — Hogan Lovells US LLP (57) ABSTRACT

Various embodiments of systems and methods allow, in connection with a customized web landing page, a "shake to reveal" content functionality, wherein an end-user customer provides input, via an electronic device, with respect to predefined categories, and content responsive to the input is determined. The content may include a product or service recommendation and will have one or more sensory aspects pertaining thereto. Upon performance of a triggering action on the end-user device, the device is provided with aural, visual, haptic, or other feedback conveying the sensory aspects. Further, the content is displayed on the device. Varying forms of end-user triggering actions may be performed, and embodiments may use a neural network trained on a data set to generate the recommendations and select content for the end-user.

20 Claims, 6 Drawing Sheets

(56) References Cited

U.S. PATENT DOCUMENTS

| | | | |
|---|---|---|---|
| 9,864,499 B2* | 1/2018 | Nakagawa | G06F 3/0485 |
| 9,940,001 B2* | 4/2018 | Agger | G06F 3/04842 |
| 10,007,340 B2* | 6/2018 | Cruz-Hernandez | G06F 3/0488 |
| 10,118,092 B2* | 11/2018 | Alpay | G02B 7/006 |
| 10,437,429 B2* | 10/2019 | Soni | H04L 51/14 |
| 2005/0212755 A1* | 9/2005 | Marvit | G06F 1/1626 345/156 |
| 2010/0053069 A1* | 3/2010 | Tricoukes | G06F 3/1431 345/156 |
| 2010/0169772 A1* | 7/2010 | Stallings | G06F 3/04812 715/702 |
| 2011/0248992 A1* | 10/2011 | van Os | G06T 11/60 345/419 |
| 2012/0225635 A1* | 9/2012 | Esbensen | H04M 1/72541 455/404.2 |
| 2013/0187850 A1* | 7/2013 | Schulz | G06F 3/03 345/156 |
| 2013/0225236 A1* | 8/2013 | Lee | G06F 16/58 455/556.1 |
| 2014/0046939 A1* | 2/2014 | Xu | G06F 16/24578 707/732 |
| 2014/0351698 A1* | 11/2014 | Nakagawa | G06F 3/0485 715/702 |
| 2015/0119108 A1* | 4/2015 | Philbin | H04W 52/0254 455/566 |
| 2016/0026913 A1* | 1/2016 | Moon | G06N 3/04 706/25 |
| 2016/0098084 A1* | 4/2016 | Hwang | G06F 3/016 345/173 |
| 2016/0232131 A1* | 8/2016 | Liu | G06F 17/211 |
| 2016/0357506 A1* | 12/2016 | Alsina | G06F 3/165 |
| 2016/0373804 A1* | 12/2016 | Iyer | G06F 3/0488 |
| 2017/0094360 A1* | 3/2017 | Keighran | H04N 21/4318 |
| 2017/0168681 A1* | 6/2017 | Agger | G06F 3/04842 |
| 2018/0065034 A1* | 3/2018 | Alpay | G02B 7/006 |
| 2018/0136802 A1* | 5/2018 | Soni | G06F 3/04817 |
| 2019/0025921 A1* | 1/2019 | Hwang | G06F 1/1626 |
| 2019/0204868 A1* | 7/2019 | Choi | G06F 1/16 |

OTHER PUBLICATIONS

Machine translation of Yu (Chinese Patent Publication 105892878 A), translation dated Dec. 8, 2019 (Year: 2019).*

* cited by examiner

SENSORY-BASED DELIVERY OF CONTENT

BACKGROUND

In the retail world, customer awareness and engagement is a timeless challenge. Given the vast array of product and service offerings available in this era, both online and at traditional brick-and-mortar establishments, prospective customers need all the assistance they can get when selecting a product or service, including online content such as movies or music. Indeed, it can prove quite difficult to select the "right" gift, particularly from a line of products with many offerings. And, on the vendor side, especially in the case of a new branding strategy or during a specific campaign (including those which are holiday-specific), keeping one or more particular offerings "top of mind" can prove challenging.

While convenient physical interactions such as shaking an omnipresent smartphone can be used as an event trigger or other input means, the world of e-commerce has yet to realize the advantages of such interaction for delivering, or otherwise triggering content and advice, suggestions, or recommendations pertaining thereto. Similarly, static web landing pages and traditional recommendation software engines can be helpful, but have become somewhat routine and do not drive customer awareness. Such recommendations "shoveled" to prospective customers and users are not engaging, particularly as to the senses.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to customized or personalized product and service suggestions and content delivery. In order to guide a purchasing decision, illustrative functionality herein enables an end-user customer to, for example, select an age range and then choose a descriptor which best describes for whom he or she is shopping. In so doing, the present systems and methods provide a fun and engaging way to interact with content which is the subject of a given branding or other marketing campaign. Features in the present disclosure are especially useful in the gift-buying context, when the putative end-user purchaser will know at least certain interests and other classifying information pertaining to the recipient. For example, when a child is invited to a friend's birthday party, the child's parent will often know the age of the friend and types of things in which the friend is interested, but will not necessarily be equipped to conceive an idea for a birthday gift which will resonate with the friend. Results obtained hereunder can deliver a quick, simple solution for such a problem.

Figure 1A:
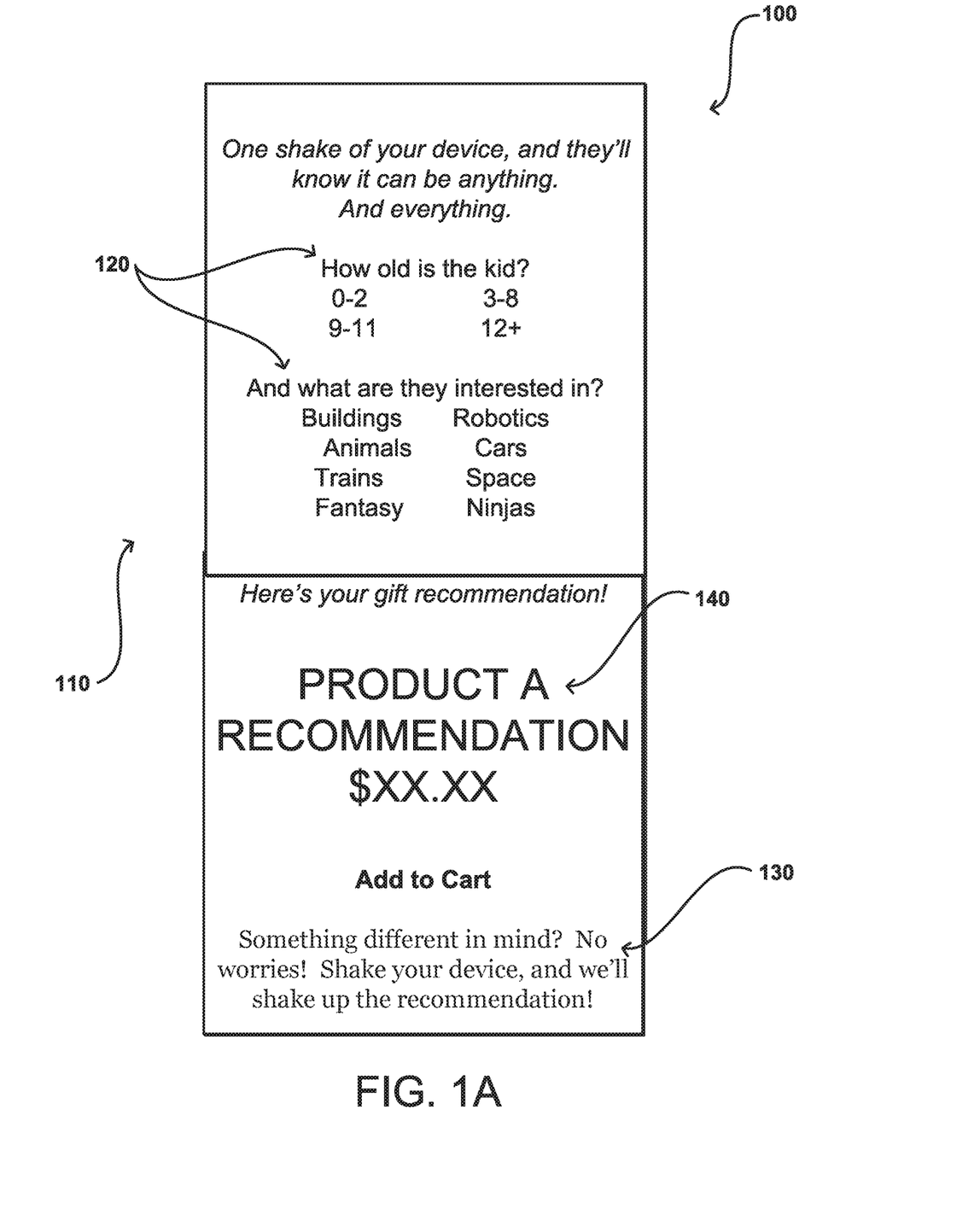
FIG. 1A illustrates a representative electronic device screen shot where, in accordance with various embodiments, a product recommendation is offered in response to one or more inputs and a triggering action.
Figure 1B:
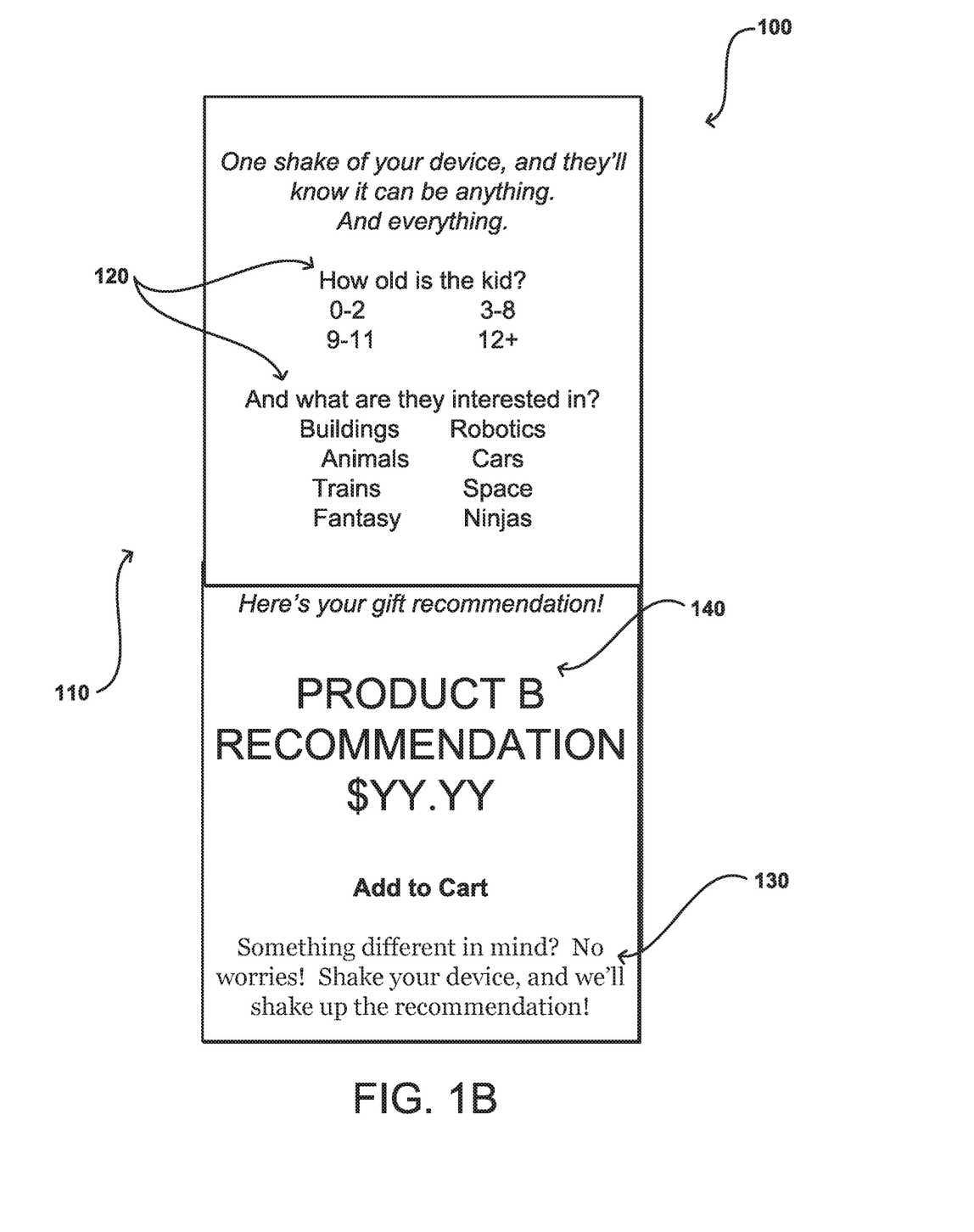
FIG. 1B illustrates another representative electronic device screen shot where, in accordance with various embodiments, a different product recommendation is offered in response to one or more inputs and a second triggering action.

Broadly speaking, a platform using a suggestion or recommendation engine is configured to deliver content, as may be seen in the representative screen shot excerpt 100 of FIG. 1A, to a perusing potential end-user customer operating a smartphone, tablet computer, personal computing, or other electronic device 110. Through a software application or a website, the illustrative user interface shown in FIG. 1A seeks input 120 from an end-user customer with respect to one or more categories of information, requests 130 a shaking or other triggering action by the end-user, and delivers a product or service recommendation or other content 140 to the end-user. In delivering such recommendation or content 140, sonic or other sensory aspects relating thereto are provided are also provided as feedback to the end-user, on a generally synchronous basis with the triggering action in some embodiments. Similarly, FIG. 1B illustrates the user interface where a different product recommendation 140 is offered in response to the previous (or a new) input 120 and a second (or subsequent) triggering action, with the second recommendation 140 delivered generally synchronous with the second (or subsequent) triggering action. It should be noted that, while the sensory feedback may be provided to the end-user generally synchronous with the triggering action, that need not be the case in every embodiment, and the sensory feedback may follow the triggering action.

Figure 2:
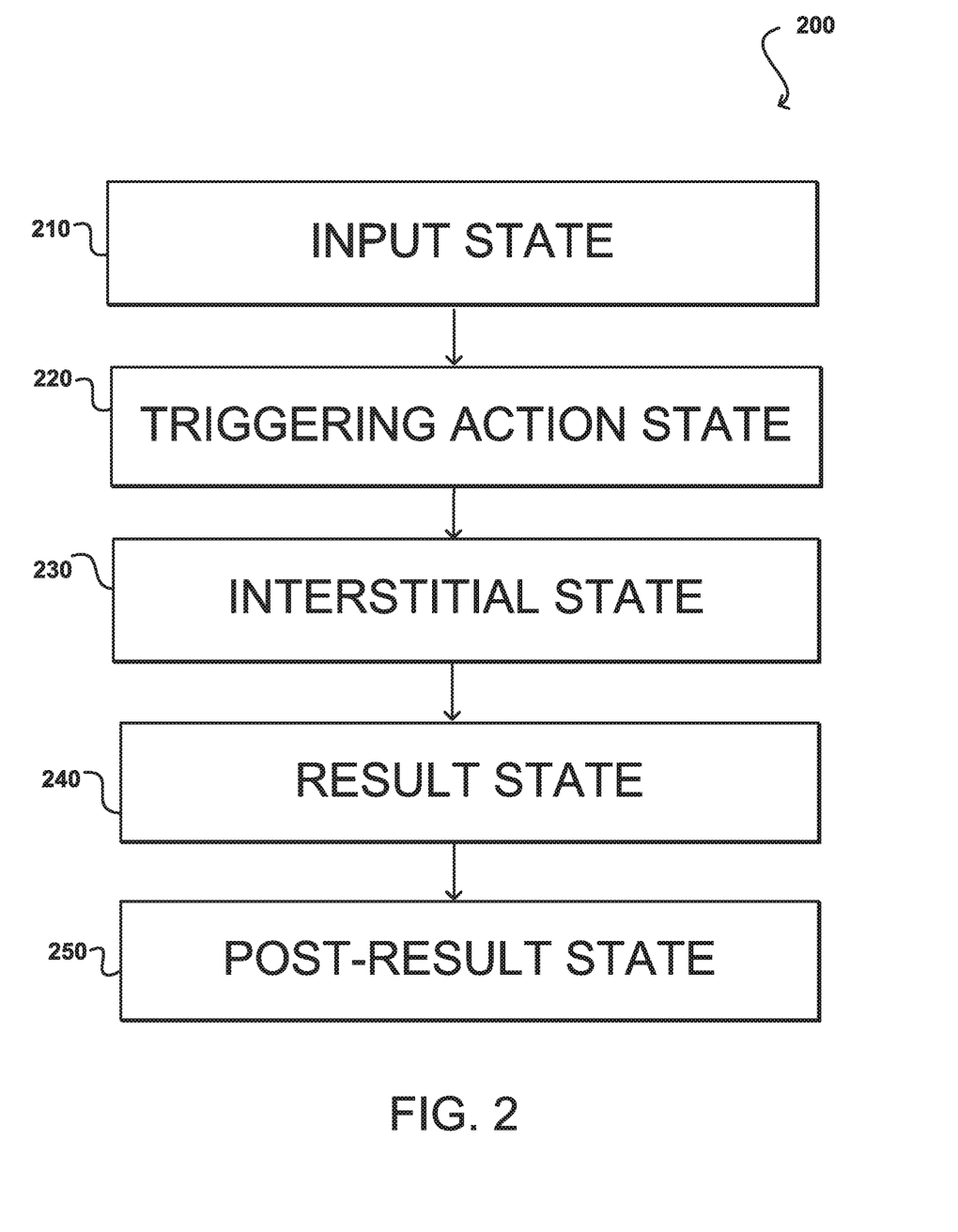
FIG. 2 is a block diagram illustrating representative stages employed by systems and methods herein for sensory-based delivery of recommendations and other content in accordance with various embodiments.

FIG. 2 illustrates general stages 200 utilized by some embodiments of the present systems and methods: an input state 210, a triggering action state 220, an interstitial state 230, a result state 240, and a post-result state 250. In an input state 210, the end-user, such as a perusing potential customer operating a personal computing or other electronic device 110, is asked to provide input 120 through a customized landing web page interface, as further detailed herein. In the triggering action state 220, the end-user performs an action on his or her device 110 to trigger a delivery of a recommendation or other content 140. For example, and as shown in FIGS. 1A and 1B, end-users in an illustrative embodiment are requested to "shake up their imaginations" (i.e., shake their devices). An interstitial state 230 may be used to present tantalizing, audio-visual materials, such as a confetti animation, to heighten end-user anticipation of the recommendation or other content 140. The result state 240 occurs following the triggering action by the end-user, as well as interstitial state 230, and can entail presenting the end-user with feedback in the form of one or more sensory aspects or effects relating to a suggested product, service, or other content 140. In one "shake to reveal" application of the present system and methods, an end-user seeking a LEGO® brand interlocking brick toy will shake a device 110 during the triggering action state 220 to yield displayed visual content 140 and playing of sound effects pertaining to such a toy (LEGO® is a registered trademark of Lego Juris A/S).

In the result state 240, during or after the sensory aspect presentation, one or more, potentially randomized, product, service, or other content suggestions 140 are presented to the end-user on the electronic device 110, with the suggestions 140 based on the input 120 provided. In a post-result state 250, if the end-user customer clicks on, or otherwise selects, the revealed recommended product, service, or other content 140, the user can be directed to a detail page. Shaking the electronic device 110 again would return the end-user's experience to the triggering action state 220 in some embodiments, while scrolling or otherwise manipulating the device 110 to the input 120 portion of the interface will return the end-user to the input state 210.

Figure 3:
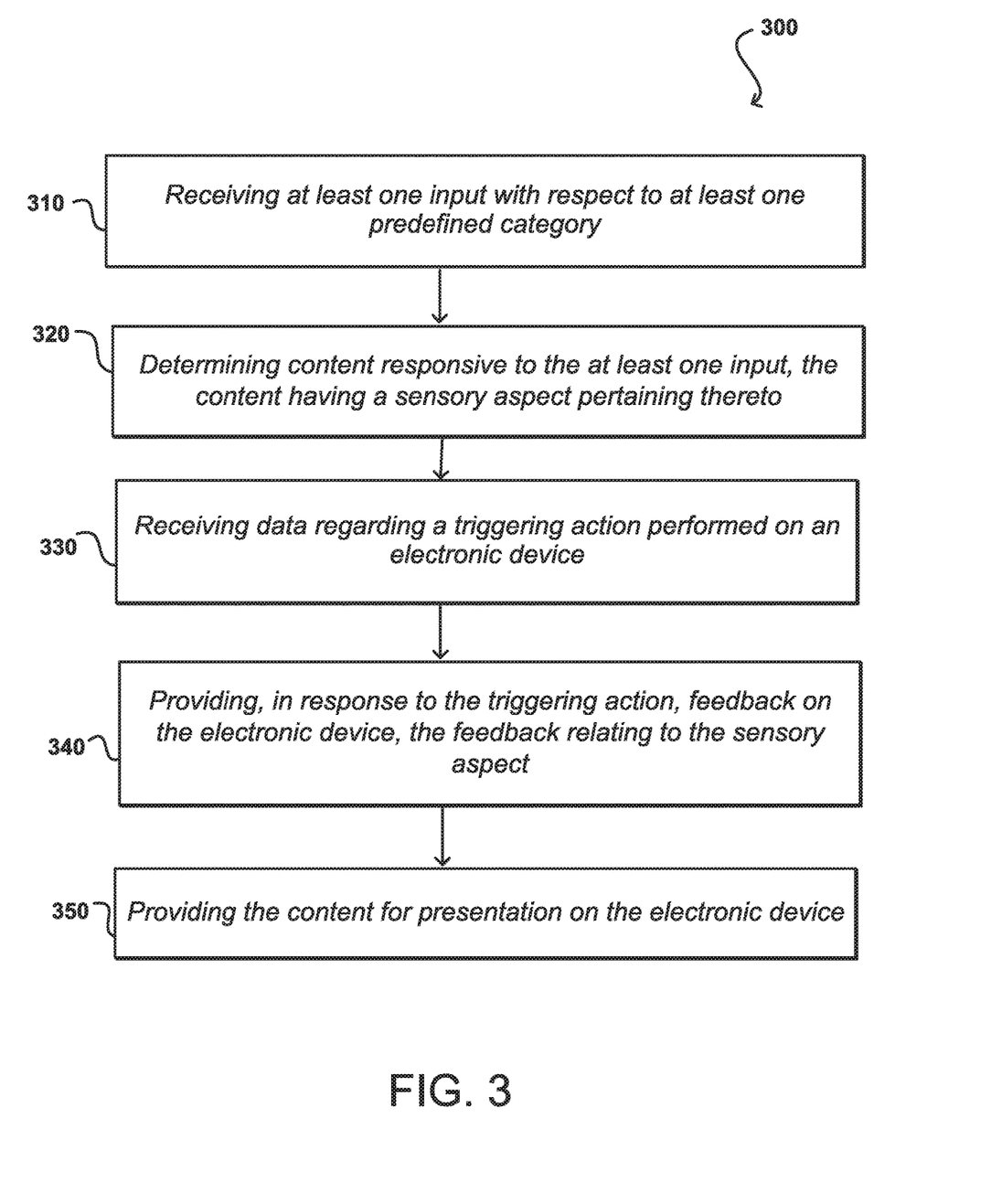
FIG. 3 illustrates a representative process for providing sensory-based content recommendations and delivery in accordance with various embodiments.

Further details with respect to illustrative embodiments are set forth in FIG. 3's representative process flow. A method 300 for providing a sensory-based delivery of product and service recommendations and other content 140 commences with receiving 310 at least one input 120, with respect to at least one predefined category of information, from an end-user customer using an electronic device 110. As will be discussed herein, the input 120 types and categories are unlimited. Content 140 responsive to the at least one input 120 is determined 320, and such content 140 will have one or more sensory aspects pertaining thereto. Data is then received 330 regarding a triggering action performed on the end-user's electronic device 110. In response to that triggering action, sensory-type feedback is provided 340 to, and presented on, the electronic device 110, the feedback relating to the sensory aspect. In particular, the provided sensory feedback relates in at least one way to the sensory aspects of the at least one input 120. The content 140, which is not limited in style or substance, is also provided 350 for presentation on the end-user's electronic device 110.

In a representative internet or web-based embodiment, a customized "landing" web page can greet potential customers and present systems and methods discussed herein. Such a landing page can include animation and/or sound to reinforce the subject campaign, be it branding or otherwise. Custom features are used on a landing page to bring campaigns "to life." Some embodiments can, at an early stage, such as upon an end-user customer reaching the web page, perform a check or verification to assure that the customer device 110 can support accelerometer or device motion tracking. If the customer device 110 does not support motion, the customer can be automatically redirected to a different, more traditional interface, where no triggering action is required.

The landing page for end-users can be customized and configured, using web design techniques known in the art, to receive input 120 for factors such as age and interests. At least one guiding input 120 from a perusing end-user is sought in illustrative embodiments, but the number of inputs 120 is not limited. In some embodiments, input 120 to questions may be sought and obtained through tactile or aural answers received by the end-user device 110. For time expediency, avoiding computing system lag, and/or other reasons, such as maintaining customer engagement, the input 120 questions may be limited to two, three, or four in some illustrative embodiments. An age, gender, and interests are but three examples of potential input 120 categories. For example, interest input 120 pertaining to a child could be cars or simply "things that go zoom," fantasies and adventures, buildings, favorite color, favorite sports team, or the like.

Further, the input state 210 and process can be dynamic. In one exemplary embodiment, depending on how the end-user answers or responds a question, the number of input 120 questions may increase or decrease. Alternatively, end-user customer input 120 could be partially or completely optional or not required at all, with recommendations or other content 140 delivered based more simply on the end-user reaching a landing page and taking a triggering action.

An accelerometer, a device which measures acceleration, provides functionality present in a multitude of electronic devices presently in use. In various embodiments, the triggering action state 220 herein can leverage accelerometer functionality in mobile and tablet end-user devices 110 to implement a "shake-to-reveal" concept. The concept could be adapted to many platforms and scenarios where retailers or others offering a product or service want to guide end-user customers through an interactive path to acquire content and otherwise make other purchases based on recommendations or suggestions 140. For example, as an end-user device 110 is shaking during the triggering action state 220, the tantalizing sound of a wrapped gift comprised of multiple pieces may synchronously be presented to the end-user, such as a set of interlocking bricks or a puzzle.

Other types of customer interaction, besides shaking a smartphone or other electronic device 110, are certainly envisioned, including, but not limited to, a wave of a hand, a shake of the head, and spoken words. Cross-platform implementations are possible, on both mobile and desktop computing devices 110, with triggering action state 220 events such as mouse toggling utilized. In this vein, it should be noted that, while the notion of an accelerometer-detected shaking of the end-user device 110 is discussed herein, such is by no means limited, and the triggering actions taken on the front-end by a potential customer can include all sorts of device 110 input, including toggling a mouse on a desktop or laptop computer, manipulating a touchpad on a laptop, detecting a wave motion or other visual input via a camera on the customer's device, or detecting one or more words or sounds via a microphone in a customer device or through the customer's voice-controlled intelligent personal assistant service. In an embodiment, a customer uttering the word "shake" is into a computing device 110 microphone is used as an action to trigger the display of recommended content 140 and presentation of sensory aspects pertaining thereto.

In the context of detecting end-user device 110 shaking or another movement as an action for triggering recommendations, an acceptability threshold may be set, such that accidental or other minimal movements are not mistaken by the system as a request for a recommendation. Likewise, a threshold limiter may be applied to other input modes, such as requiring a certain decibel level for utterances.

As noted, the recommendations or other content 140 provided to the end-user customer can have one or more sensory aspects pertaining thereto. In response to a triggering action performed on the end-user device 110, feedback provided on the device 110 can include one or more sensory aspects presented to the end-user. Such sensory aspect and feedback is not limited and could be aspects such as a sound (auditory or aural feedback), movement, and visuals to enhance the customer experience and interaction with the present systems and methods. For example, a technologically "smart" perfume or cologne display in a department store could work in tandem with a shopping user's smartphone for receiving input and providing the user with a sample smell based on the input. Iterations of the present systems and methods could also, or alternatively, use and provide haptic or tactile feedback, providing felt sensations in the hand or other parts of the body. In this vein, reverse electro-vibration or "virtual touch" may be with virtual reality (VR) and augmented reality (AR) technology to allow the shopping end-users to perceive textures and contours of remote objects.

The present systems and methods may be used to deliver recommendations and other content 140 for any number of products and/or services, including, but not limited to, movies, music, clothing, and consumer packaged goods (CPG). The content 140 provided may be randomly selected from a wide swath of offerings, while still responsive to the received input 120, or can be iteratively selected from among one or more designated sets of good and services. In the interest of delivering targeted, or at least more on-point suggestions 140, in some embodiments, probability calculations, as well as customer end-user categorical input 120, can be applied to predict and suggest specific categories, subcategories, classes, subclasses, types, and the like for the recommendation and other content 140 delivery.

Anywhere an end-user consumer is looking to make a purchase, and isn't quite sure what he or she is seeking, is a type of suitable environment, with the consumer being helped based on what input 120 is entered during the input state 210. In particular, interlocking brick toys, such as those offered by Lego System A/S (doing business as The LEGO Group) of Billund, Denmark, offer an illustrative embodiment of note. A new LEGO® set makes an iconic sound of unconnected bricks moving about the packaging when the box is shaken. Such a sound can be leveraged in connection with the accelerometer in electronic devices to recreate the experience of shaking a box of LEGO® bricks in the digital space.

A clothing or beauty product recommendation could be based, at least in part, on the colors or other visual aspect ascertained from a submitted photograph. Hair coloring and makeup recommendations would benefit from such input 120 and personalized recommendations 140, with sensory-based feedback presented to the seeking customer in the form a color splash displayed on an electronic device 110. Packaged food can benefit as well, particularly those with an array of flavor options. For example, the sound of potato chips moving about inside a package may be delivered to a hungry customer seeking a snack recommendation and trying to hone in on a particular favor. That appealing sound would serve to whet the customer's appetite, and the selection would be well-received as it is based on the customer's input 120. In the setting of someone desiring to rent a movie, either a physical media or streamed online, in response to, say, the individual indicating an affinity for comedies and a given actor, and then taking action on an affiliated electronic device 110 to trigger sensory-based feedback, such as the sound of laughter, the individual can receive a suitable motion picture recommendations on the device 110.

It should be noted that the output (i.e., the delivered content 140) hereunder can include, or even consist entirely of, targeted advertising which is pertinent to the input 120 received. Standard web-tracking metrics may be tracked, such as quartiles on videos, web page dwelling time, page scroll depth, tracking when customer devices do not support accelerometer or device-motion functionality, link tracking, purchases/conversions, sales attributed to this experience, and successful page renderings.

In some embodiments, neural network, deep learning, and other machine learning techniques can be applied to train a model used to further hone and optimize the input 120 sought and/or the recommended products and services 140, based on collected data and metadata, be it specific to the shopping user or the greater set of users. Such collected data and metadata will allow the systems and methods herein to "learn" meanings from systems' and particular users' patterns, histories, trends, tendencies, and the like, in order to automatically offer the end-user better-targeted recommendations, suggestions, and other content 140. As is known in the neural network and artificial intelligence arts, a variety of neural network types could be applied, including, but by no means limited to, feedforward, recurrent, radial basis function, modular, and self-organizing neural networks. Prior to production environment use, a non-production data set may be employed for training a neural network model for generating the recommendations and other content 140. The systems and methods can use a beam search or other algorithm to efficiently rank the content 140, and optimizations in some embodiments are made to a predictive system so that the optimized recommendations 140 can be made in real time. Although graphics processing units (GPUs) are effective for many deep learning neural network applications, the present systems and methods can be used with GPU-based or central processing unit (CPU)-based systems.

The technology infrastructure is open to customization and, in at least some embodiments, can include a web stack, or collection, of software, such as that created by the Java® programming language, an object-oriented, high level programming language. JavaScript® Object Notation (JSON) files may be used as part of building the landing page, JSON being an open-standard file format using human-readable text to transmit data objects consisting of attribute-value pairs and array data types. JavaScript® code can power a recommendation engine, with such entailing monitoring motion and velocity of an enabled electronic device 110 through accessing and tracking rapid changes in accelerometer data. Java and JavaScript are registered trademarks of Oracle and/or its affiliates.

Among other things, the front-end shake functionality serves as a way of validating that a viable customer device 110 is present and ready for recommendation 140 delivery. JavaScript® code may be used to detect whether accelerometer or device motion functionality is enabled on the customer device 110 and whether movement has occurred. On the back-end, product and/or service content 140, including that optimized via machine learning, may be pulled from one or more databases, provided that triggering action is taken on the customer device 110 and the back-end systems are notified. The content may include unique identifiers such as the well-established Amazon Standard Identification Number (ASIN) identifier.

Forms can be used to facilitate efficient content 140 additions and removals, and particular offerings to recommend given a particular combination of inputs 120 may be accommodated. More particularly, a form can save the ASINs as a JSON object, and an appropriate combination may be displayed on a web page as the page is rendered. One approach is to have all possible content 140 combinations or permutations present on a page, but hidden until a relevant combination is determined and the end-user device 110 triggering action occurs during a triggering action state 220. To accommodate machine learning, the creation and updating of the content 140 database may occur automatically in whole or in part by one or more algorithms.

Figure 4:
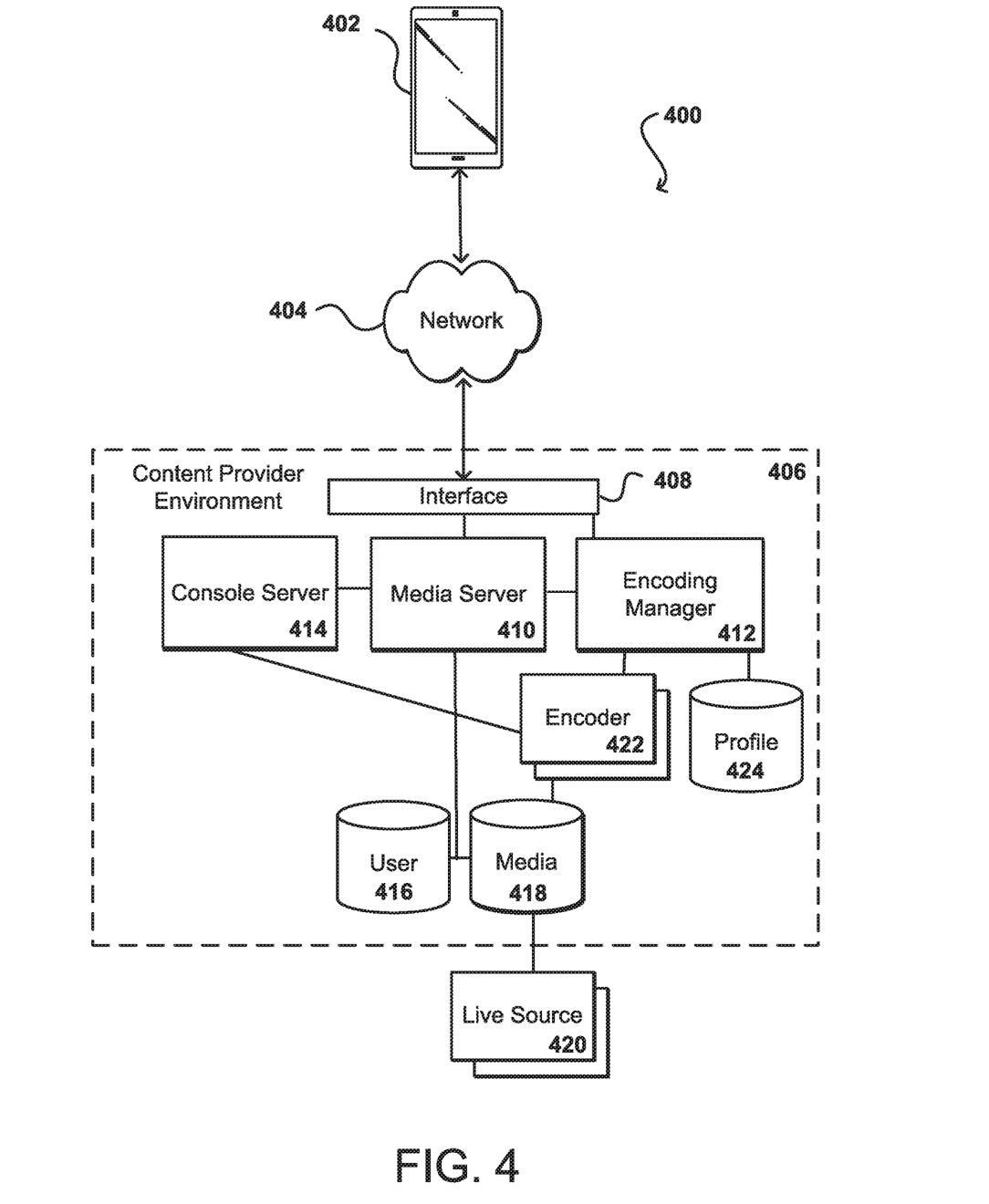
FIG. 4 illustrates an example content recommendation service that can be utilized in accordance with various embodiments.

FIG. 4 depicts an illustrative architecture 400 for a searchable content 140 delivery service in which aspects of the various embodiments can be implemented. In this example, a client computing device 402 is the end-user device 110 and can submit input 120 and triggering action data across at least one network 404 to be received by a content provider environment 406. The submitted client device 402 data can include a request for specific content 140 or a subscription to have content pushed to the client device 402, among other options. In at least some embodiments, the submitted data can include a request for content 140 to be displayed on, or presented via, the computing device 402, and may include video, audio, or other media content that is encoded for presentation by the client device 402. The network(s) 404 can include any appropriate network, such as the internet, a local area network (LAN), a cellular network, an Ethernet, or other such wired and/or wireless network. The content provider environment 406 can include any appropriate resources for receiving queries and providing content from a resource provider, as may include various servers, data stores, and other such components known or used for providing content from across a network (or from "the cloud"). As noted previously, the client computing device 402 used by an end-user customer can be any appropriate computing or processing device, and may include a desktop or notebook computer, smartphone, tablet, wearable computer (i.e., a smart watch, glasses, or contacts), set top box, or other such system or device. An interface layer 408, when receiving a query or other request or call, can determine the type of query, call, or request and cause information to be forwarded to the appropriate component or sub-system. For example, a query or similar request for content 140 might be forwarded to a media server 410 while a request to generate an encoding profile might be forwarded to an encoding manager 412 or a console server 414, among other such options. These calls or requests can also come from third parties, such as streaming content providers who utilize the resources of the content provider environment 406, and third party providers can provide at least some of the content to be stored to a media repository and/or encoded for display on the client device 402. Further, a different type of client device 402 can be used to provide encoding information than is used to consume encoded content.

In this example, a query, call, or request received to the content provider environment 406 can be received by an interface layer 408 of the environment. As is known for network environments, the interface layer can include components such as search engine boxes and other interfaces (e.g., APIs), load balancers, request and/or data routers, and the like. If the query or other request is a request for content 140 to be provided to the client device 402, information for the request can be directed to one or more media servers 410, which can obtain the content from a media data store 418 or other such repository or live media source 420 (or data cache temporarily storing media from the live media source) to be sent back across the network(s) 404 to the client device 402, which can be the device submitting the request or a device identified by the request, among other such options. In some embodiments, information for the request might also be compared against user data in a user data store 416 or other such location to determine, for example, whether the user has access rights to that content 140, and potentially the formats or versions to which the user has access rights. In at least some embodiments a request from an operator, an administrator, a client device 402, a third party provider, or another such source might include a request to specify one or more sets of encoding parameters to be used with a media file. Accordingly, information regarding the encoding parameters can be provided to an encoding manager 412, or other such component or service, that is able to receive the information through an appropriate interface (i.e., an API or console) and cause the profile and parameter data to be stored to at least one appropriate repository 424. When a query or request for a video file is received, the encoding manager 412 can use the profile and parameter data to determine the appropriate encoding information, and can pass that to one or more encoders 422, such as may include encoding applications running on one or more allocated servers (physical or virtual), which can obtain the media file and encode the media file per the encoding information, which can then be provided to the client device by a media server 410 or other such component.

As mentioned, it may be desired to provide product or service recommendations 140 received by the content provider environment 406. A component such as the console server 414 can cause a query to be analyzed, and a query completion service can analyze a query using one or more completion modules, and may include completion algorithms or trained neural networks, among other such options, and can compare the data in some embodiments against representations of object stored to an object data store. Confidence and/or probability scores can be generated for each determination in some embodiments, and input 120 and/or content 140 can be analyzed in some embodiments to improve the scores, including during a training or machine learning phase. Resulting object data, such as timestamps, can then be written to the encoder 422 for encoding in a log file, or stored to a media data store 418, among other options.

Storage media and other non-transitory computer readable media for containing product and service recommendation and other content 140 or code can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device.

It should be understood that there can be several application servers, layers, or other elements, processes, or components, which may be chained or otherwise configured, which can interact to perform tasks such as obtaining query and query completion data from an appropriate data set, database, or data store. As used herein the term "data set," "database," or "data store" refers to any device or combination of devices capable of storing, accessing, and retrieving data, which may include any combination and number of data servers, databases, data stores, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to an end-user, which may be served by the web server in the form of HTML, Extensible Markup Language (XML), or another appropriate structured language in this example. The handling of all requests and responses, as well as the delivery of content between the client device 402 and the application server, can be handled by the web server. Content relating to a particular suggested item of user interest can be viewed in a dedicated page or window of the user's browser. And a search engine or other query opportunity can narrow the range of possible suggestions 140 by including input 120 functionality allowing categorization, such as a drop-down option in a search box permitting the querying user to specify a particular type of product or service being sought. It should be understood, though, that the web and application servers are not required and are merely example components, as structured code discussed herein can be executed on any appropriate device or host machine as discussed elsewhere herein.

The data set can include several separate data tables, databases, or other data storage mechanisms and media for storing data relating to a particular aspect. For example, the data store can include mechanisms for storing recommendation content 140, training data for purposes of developing a model, and test results. The data store is operable, through logic associated therewith, to receive instructions from a server and obtain, update or otherwise process data in response thereto.

Figure 5:
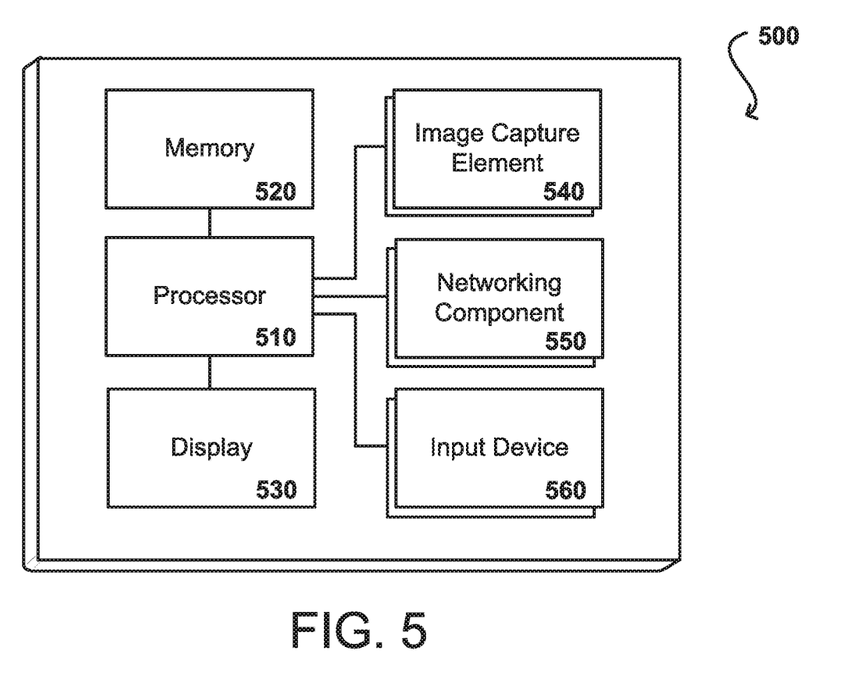
FIG. 5 illustrates components of an example computing device that can be used in accordance with various embodiments.

FIG. 5 illustrates a set of basic components of an end-user electronic device 500 which can be used to implement aspects of the various embodiments, including submitting input 120, performing a triggering action during a triggering action state 220, receiving sensory feedback, and displaying the content 140 on a client device 402 on a network 404. In this example, the device 500 includes at least one processor 510 for executing instructions that can be stored in a memory device or element 520. As would be apparent to one of ordinary skill in the art, the device can include many types of memory 520, data storage, or computer-readable media, such as a first data storage for program instructions for execution by the at least one processor 510 (which, again, can be, or include, a GPU or CPU in some embodiments), the same or separate storage can be used for images or data, a removable memory 520 can be available for sharing information with other devices, and any number of communication approaches can be available for sharing with other devices. The device typically will include at least one type of display element 530, such as a touch screen, electronic ink (e-ink), organic light emitting diode (OLED), or liquid crystal display (LCD), although devices such as portable media players might convey information via other means, such as through audio speakers.

The device 500 in some embodiments will include at least one video or image capture element 540, such as at least one video or image capture element 540 positioned to determine a relative position of a viewer and at least one video or image capture element 540 operable to image a user, people, or other viewable objects in the vicinity of the device 500. A video or image capture element 540 can include any appropriate technology, such as a charge-coupled device (CCD) video or image capture element 540 having a sufficient resolution, focal range, and viewable area, to capture video or an image when the user is operating the device 500. Methods for capturing images or video using an image capture element with a computing device are well known in the art and will not be discussed herein in detail. It should be understood that video or image capture can be performed using a single image, multiple images, periodic imaging, continuous image capturing, image streaming, etc. The device 500 can include at least one networking component 550 as well, and, as noted, may include one or more components enabling communication across at least one network 404, such as the internet, a cellular network, an intranet, an extranet, a local area network, Wi-Fi, and the like. Accordingly, it is envisioned that sensory feedback and content may be delivered which relate in some way to images captured by the image capture element 540.

The device 500 can include at least one motion and/or orientation determining element, such as an accelerometer, digital compass, electronic gyroscope, or inertial sensor, which can assist in determining movement or other changes in orientation of the device. The device 500 can include at least one additional input device 560 able to receive conventional input from a user. This conventional input can include, for example, a push button, touch pad, touch screen, wheel, joystick, keyboard, mouse, trackball, keypad, or any other such device or element whereby a user can input a command to the device. These input/output (I/O) devices 560 could even be connected by a wireless infrared, Bluetooth, or other link as well in some embodiments. In some embodiments, however, such a device 500 might not include any buttons at all and might be controlled only through a combination of visual and audio commands such that a user can control the device without having to be in contact with the device. In one illustrative use case, input is received through an intelligent personal assistant such as the cloud-based voice service ALEXA™ from Amazon.com, Inc.

The various embodiments can be implemented in a wide variety of programming languages and operating environments, which in some cases can include one or more user computers, computing devices, or processing devices which can be used to operate any of a number of applications. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in the accompanying figures. Further, one programming language may be utilized for the training phase, while another language may be used to develop the production system. Thus, the depiction of the systems and environments in the figures, as well as this written description, should be taken as being illustrative in nature and not limiting to the scope of the disclosure.

The end-user 110/client devices 402 can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network Various aspects also can be implemented as part of at least one service, such as may be part of a web-based, service-oriented architecture. Services such as web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network 404 that would be familiar to those skilled in the art for supporting communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk. The network 404 can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol (HTTP) servers, File Transfer Protocol (FTP) servers, Common Gateway Interface (CGI) servers, data servers, Java servers, and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

Based on the disclosure and teachings provided herein, a person of ordinary skill in the art will appreciate other ways and/or methods to implement the various embodiments. The specification and drawings are, accordingly, to be regarded in an illustrative, rather than a restrictive, sense. It will be evident that various modifications and changes may be made thereunto without departing from the broader spirit and scope of the invention as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods and steps described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computer-implemented method, comprising:
   receiving an input in response to at least one question about a prospective consumer of a product;
   determining first recommendation content responsive to the input, the first recommendation content having a sonic aspect pertaining to the product;
   receiving accelerometer data regarding a first triggering motion performed on an electronic device;
   providing aural feedback on the electronic device, the aural feedback relating to the sonic aspect and generally synchronous with the first triggering motion;
   providing the first recommendation content for presentation on the electronic device;
   receiving accelerometer data regarding a second triggering motion performed on the electronic device;
   determining a second recommendation content responsive to the first input;
   providing the aural feedback on the electronic device, the aural feedback generally synchronous with the second triggering motion; and
   providing the second recommendation content for presentation on the electronic device.

2. The computer-implemented method of claim 1, wherein the input comprises at least one of: a tactile question response, an image, a video, or an aural command.

3. The computer-implemented method of claim 1, further comprising:
   providing at least one of visual, haptic, or tactile feedback on the electronic device.

4. The computer-implemented method of claim 1, further comprising:
   providing at least one of a feedforward, recurrent, radial basis function, modular, and self-organizing neural network;
   training the neural network on a data set, the data set comprising preferences and histories; and
   applying the neural network to optimize the determination of content responsive to the input.

5. A computer-implemented method, comprising:
   receiving at least one input with respect to at least one predefined category;
   determining a plurality of content responsive to the at least one input, each content of the plurality of content having a sensory aspect pertaining thereto;
   receiving accelerometer data regarding a plurality of triggering actions performed on an electronic device;
   providing, through the electronic device, feedback relating to a plurality of sensory aspects and generally synchronous with the plurality of triggering actions; and
   providing at least a portion of the plurality of content corresponding to the plurality of sensory aspects for presentation on the electronic device.

6. The computer-implemented method of claim 5, wherein the feedback relating to the sensory aspect comprises at least one of aural, visual, haptic, or tactile feedback on the electronic device.

7. The computer-implemented method of claim 5, further comprising:
   setting a triggering action acceptability threshold, the triggering action acceptability threshold configured such that unintended or other minimal electronic device movements are not accepted as a triggering action.

8. The computer-implemented method of claim 5, further comprising:
verifying that triggering action functionality is present and accessible on the electronic device.

9. The computer-implemented method of claim 5, wherein the at least one input comprises at least one of: a tactile question response, an image, a video, or an aural command.

10. The computer-implemented method of claim 9, further comprising:
determining, in response to an additional triggering action, additional content responsive to the at least one input, the additional content having a sensory aspect pertaining thereto;
providing, in response to the additional triggering action, additional feedback on the electronic device, the feedback relating to the sensory aspect; and
providing the additional content for presentation on the electronic device.

11. The computer-implemented method of claim 5, further comprising:
receiving a second input with respect to at least one predefined category; and
updating the content presented on the electronic device pursuant to the second input.

12. The computer-implemented method of claim 5, further comprising:
training a neural network on a data set; and
applying the neural network to optimize the determination of content responsive to the at least one input.

13. A computing system, comprising:
at least one processor; and
memory including instructions that, when executed by the at least one processor, cause the computing system to:
receive at least one input with respect to at least one predefined category;
determine a plurality of content responsive to the at least one input, the content having a sensory aspect pertaining thereto;
receive accelerometer data regarding a plurality of triggering actions performed on an electronic device;
provide, through the electronic device, feedback relating to a plurality of sensory aspects and generally synchronous with the plurality of triggering actions; and
provide at least a portion of the plurality of content corresponding to the plurality of sensory aspects for presentation on the electronic device.

14. The computing system of claim 13, wherein the feedback relating to the sensory aspect comprises at least one of aural, visual, haptic, or tactile feedback on the electronic device.

15. The computing system of claim 13, wherein the instructions when executed further cause the computing system to:
set a triggering action acceptability threshold, the triggering action acceptability threshold configured such that unintended or other minimal electronic device movements are not accepted as a triggering action.

16. The computing system of claim 13, wherein the instructions when executed further cause the computing system to:
verify that triggering action functionality is present and accessible on the electronic device.

17. The computing system of claim 13, wherein the at least one input comprises at least one of: a tactile question response, an image, a video, or an aural command.

18. The computing system of claim 13, wherein the instructions when executed further cause the computing system to:
determine, in response to an additional triggering action, additional content responsive to the at least one input, the additional content having a sensory aspect pertaining thereto;
provide, in response to the additional triggering action, additional feedback on the electronic device, the feedback relating to the sensory aspect; and
provide the additional content for presentation on the electronic device.

19. The computing system of claim 13, wherein the instructions when executed further cause the computing system to:
receive a second input with respect to at least one predefined category; and
update the content presented on the electronic device pursuant to the second input.

20. The computing system of claim 13, wherein the instructions when executed further cause the computing system to:
train a neural network on a data set; and
apply the neural network to optimize the determination of content responsive to the at least one input.

* * * * *